United States Patent [19]

Roberts et al.

[11] Patent Number: 4,512,639
[45] Date of Patent: Apr. 23, 1985

[54] ERECTABLE LARGE OPTIC FOR OUTER SPACE APPLICATION

[75] Inventors: Thomas G. Roberts, Huntsville; Thomas E. Honeycutt, Somerville, both of Ala.

[73] Assignee: The United States of American as represented by the Secretary of the Army, Washington, D.C.

[21] Appl. No.: 510,709

[22] Filed: Jul. 5, 1983

[51] Int. Cl.³ ............................ G02B 3/12; G02B 3/14
[52] U.S. Cl. ...................................... 350/418; 350/419
[58] Field of Search ............................... 350/418, 419

[56] References Cited

PUBLICATIONS

Hales et al., "Design and Analysis of Afocal Two-Mirror Systems for arbitrary Intensity Transformations, Technical Report RH-81-2, 10/82.

*Primary Examiner*—John K. Corbin
*Assistant Examiner*—Rebecca D. Gass
*Attorney, Agent, or Firm*—Anthony T. Lane; Robert P. Gibson; James T. Deaton

[57] ABSTRACT

An erectable large optics for outer space application which includes a beam expander optic which is constructed as the output coupling portion of a feedback mirror of an unstable optical resonator and a large erectable gas lens has the focusing optic of an output aperture of a telescope.

5 Claims, 3 Drawing Figures

ERECTABLE LARGE OPTIC FOR OUTER SPACE APPLICATION

DEDICATORY CLAUSE

The invention described herein may be manufactured, used, and licensed by or for the Government for governmental purposes without the payment to us of any royalties thereon.

BACKGROUND OF THE INVENTION

Space based laser weapons and other based laser systems which are required to focus the laser beam on targets or receivers at long distances necessitate the final optic to have a correspondingly large diameter. Also, if diffraction limited performance is desired and a conventional mirror or lens is to be used, then the optical surfaces of these mirrors or lens must be accurate to a fraction of a wavelength of the laser light being used.

The diameter of the exit aperture of the antenna or telescope can be determined from the range and the desired spot size at the target. For example, the diameter D is given by:

$$D = \frac{\lambda}{\rho_T} R$$

where $\lambda$ is the laser wavelength, $\rho_T$ is the minimum radius of the spot to be produced at the target and R is the distance to the target. In some applications, the diameter may need to be as large as 20 meters. Such large good quality optics do not exist, and even if one were to be made, it would take many years to manufacture, and it would weigh so much that it could not be placed in space. For example, the mirror of a 200 inch (about 5 meters) telescope requires at present more than four years to manufacture and it weighs too much.

For defense application, many such large optics are required, and for other applications more than one will be needed. Because of this, much work has been done and is being done to develop light weight large optics that can be erected in space. Although some progress has been made, these devices are still heavy, costly, too small, and require too long to produce. Also, the optical quality needed cannot be obtained nor maintained over the required diameters.

Therefore, it is an object of this invention to provide a light weight large optics for mounting in outer space.

Another object of this invention is to provide a large optics that is light in weight due to its using gas as a medium for the lens.

Another object of this invention is to provide a relatively light weight lens that can be made of varying size and therefore adaptable to different applications.

Still another object of this invention is to provide a large erectable optics device that can be produced in a small amount of time.

Other objects and advantages of this invention will be obvious to those skilled in this art.

SUMMARY OF THE INVENTION

In accordance with this invention, an optical device is provided that includes a laser resonator with a WAXICON which includes a beam reflector or scraper and a beam expander for expanding the laser output to a large optic lens which is used to focus the laser energy to a target or a receiver as desired.

DESCRIPTION OF THE PREFERRED EMBODIMENTS

Figure 1:
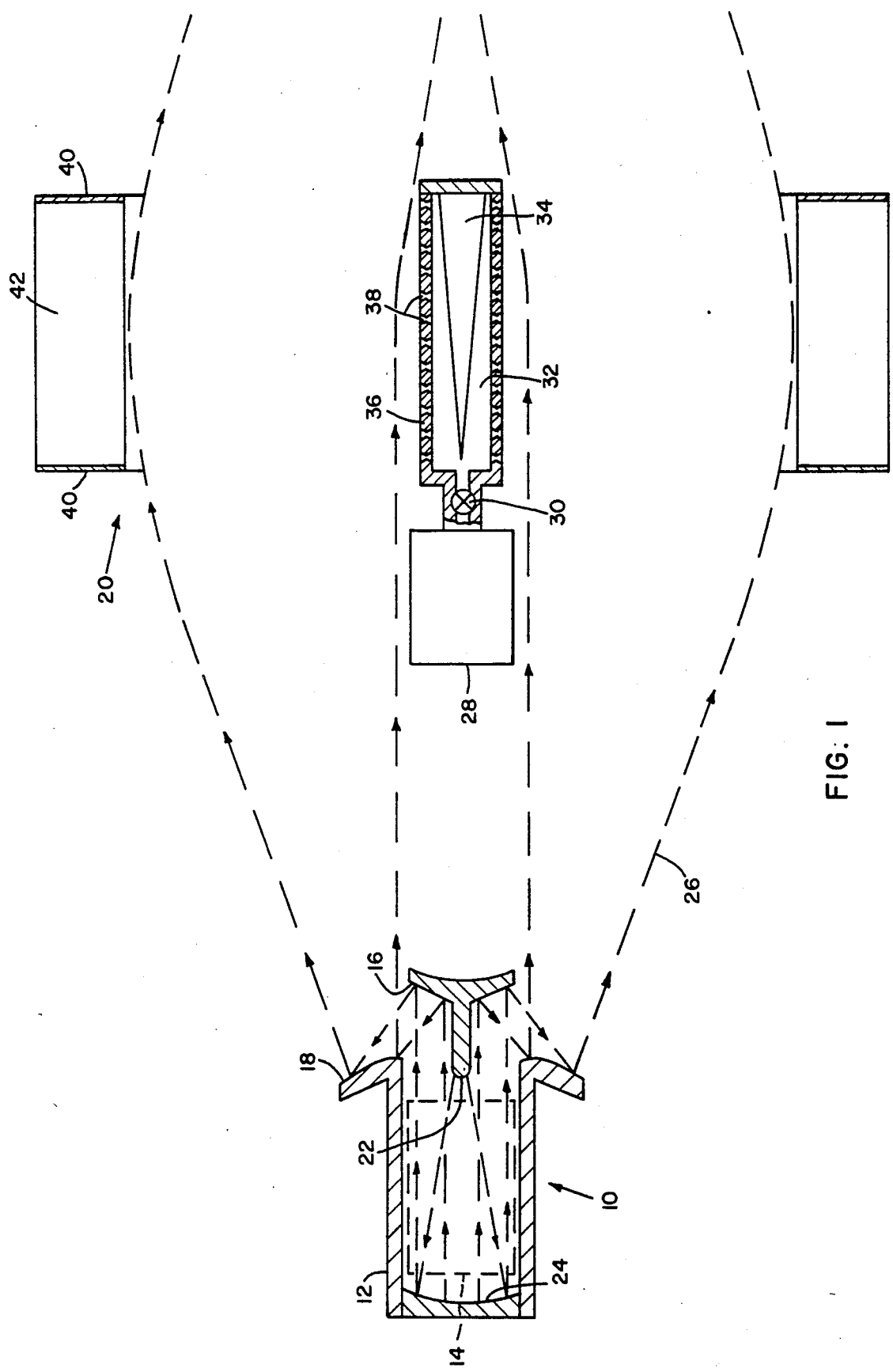
FIG. 1 is a schematic illustration of the large optics in accordance with the invention and showing a side view.
Figure 2:
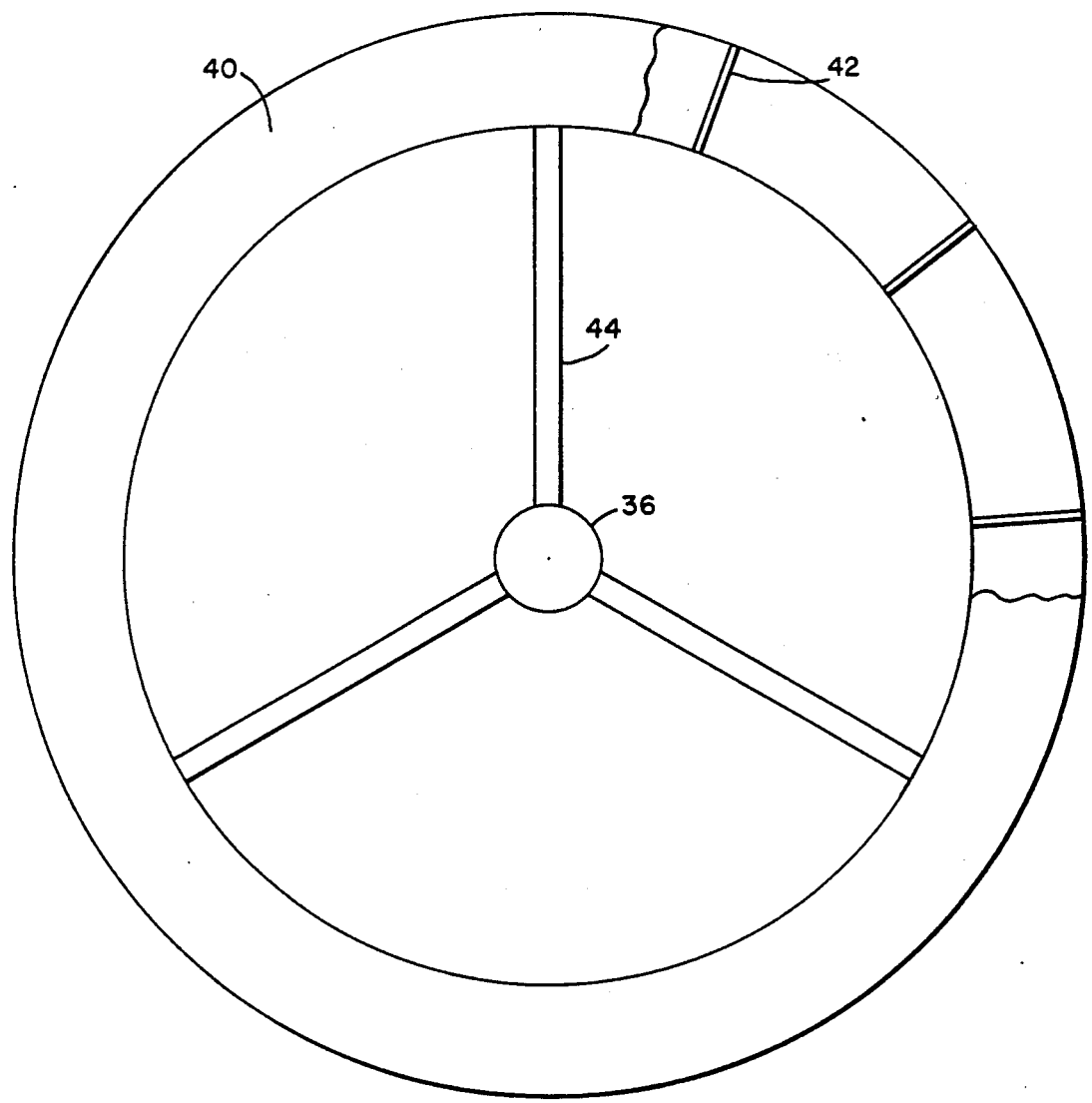
FIG. 2 is a schematic illustration of a front view of the lens with portions thereof cutaway.

Referring now to the drawings, the optical device includes a laser device 10 and a large diameter gas dynamic lens 20 for focusing energy from the laser device to a target or some receiver means. Optic device 10 includes a housing 12 with laser resonator cavity portion 14 as schematically illustrated by dotted lines with beam scraper 16 and beam expander 18 coupling out the laser radiation to gas dynamic lens 20. Beam reflector or scraper 16 and beam expander 18 form a WAXICON that is constructed and designed for this purpose as disclosed by Hales and Korsch in their technical report RH-81-2 dated October 1980, "A Design and Analysis of Afocal, Two-mirror Systems for Arbitrary Intensity Transformations". The central portion of this WAXICON also includes feedback mirror 22 and concave mirror 24 renders the beam from the resonator nearly parallel and directs it back toward beam reflector or scraper 16 as illustrated. The beam exits at beam expander 18 and is expanded and propagated as illustrated at 26 to the desired diameter of large gas dynamic lens 20 where the beam is focused and directed toward the target. An advantage of making feedback mirror 22 a part of the WAXICON is that it makes alignment and the maintaining of alignment easier. That is, feedback mirror 22 and beam reflector or scraper 16 are made on the same piece of material or structure.

Large gas dynamic lens 20 includes a high pressure gas supply 28, a fast acting valve 30 such as a controlled pop valve, a plenum chamber 32 which has mounted therein a blocking cone 34 with plenum chamber 32 being defined by housing 36 which has a multiplicity of gas dynamic nozzles 38 mounted in the side walls and projecting radially for supplying gas to the lens. The outer radius of the lens includes end members 40 that are inner connected by thin flat members in the form of fins or veins 42 and end members 40 are each connected and held in position by struts 44 to define an outer structure that helps direct the gas away from the optics in such a way that no torque is produced to tend to rotate the lens structure.

Cone 34 is used in plenum chamber 32 so that the cross-sectional area of the plenum decreases from front to back in such a way that the gas pressure is constant along the length of the plenum chamber. That is, as the gas enters the plenum chamber it tends to fill the chamber and escape through nozzles 38. This tends to cause the pressure to drop along the axis and cause less gas to escape through nozzles 38 on one end than on the other. This pressure drop is avoided by appropriately blocking the plenum with cone 34, this causes the same amount of gas to pass through each of nozzles 38.

Figure 3:
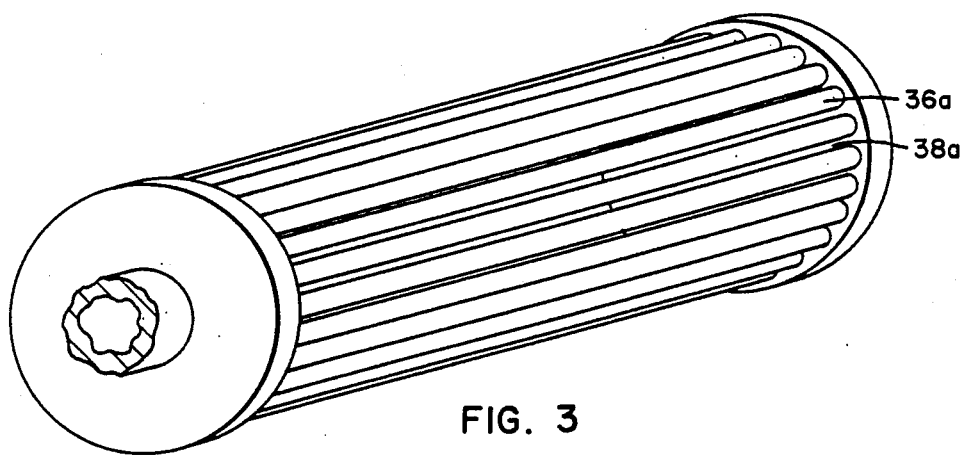
FIG. 3 is a view of another embodiment with a particular nozzle arrangement.

Aerodynamic nozzles 38 do not have to be made very accurate and are just rows of holes drilled or cut into the walls of the plenum. Nozzles 38 can be made in another way as illustrated in FIG. 3 where the plenum structure is made up of two end plates, blocking cone 34 and a multiplicity city of spaced rod or tube members 36A that form between the members nozzles 38A. Blocking cone 34 is fixed to one end plate and the end plates are fastened together using rods or tubes 36A such that rods 36A come close together but don't touch. In this manner, an expansion nozzle 38A is formed between each two of the rods. It is also noted that the extensive nozzle development of the gas dynamics and chemical laser effects can be utilized in this embodiment when aberations of large lens diameters warrant.

Gas source 28 may be liquid $N_2$, $H_2$, $O_2$, A, Ne, etc.; in which case a heater would be included but not shown here to heat the gas before passing through nozzles 38 or 38A. Heat for this can be obtained from waste energy from the laser or other parts of the space station. Supply 28 can also be a gas generator with its appropriate controls with the gas generator utilizing substances such as sodium azide to produce hot nitrogen. Many other gas generators would also work with the lens of this invention.

In operation, fast acting pop valve 30 is opened prior to the laser being fired to produce laser action in resonator cavity 14. The gas from gas supply 28 enters plenum 32 where the pressure builds up. High pressure gas escapes from chamber 32 through nozzles 38 or 38A. This causes the thermo energy of the gas in the plenum to be converted to directed kinetic energy beyond nozzles 38 or 38A. The gas then rapidly expands toward outer structure 40 and 42 and on to outer space. In this manner the density of the gas decreases from nozzles 38 or 38A to outer structure 40, 42 as $r^{-2}$ where r is a measure of the distance from the center line of plenum 32. Therefore, the index of refraction, n, also decreases from nozzles 38 to outer structure 40, 42 as $r^{-2}$. It takes about one second for the flow field to be established between nozzles 38 or 38A and outer structure 40, 42, but after it is established, any light ray passing through will be bent toward the center as illustrated, that is the optic axis of the system. This lens portion of the system behaves as a positive lens. Since the index of refraction changes here are more gradual than those for normal mirrors or lens when solid densities are suddenly experienced by the light wave, the problems with optical quality are not severe.

Once the flow field has been established, the high energy laser is pulsed to produce light in resonator cavity 14 and the light wave from cavity 14 is expanded by WAXICON structure 16, 18 and allowed to propagate to large gas dynamic lens 20 which focuses the wave on a distant target. The laser may be pulsed more than once but after the burst of pulses has been launched, then valve 30 is closed and the system is ready to be used again in the same manner as described above. The system can be used as many times as there is gas from supply 28 and there is sufficient power to operate the laser to produce light output from resonator cavity 14.

The device produced here is a large optical system which utilizes a unique gas dynamic lens and which can be manufactured in a short time at low cost. The optical system is erectable in the sense that the focusing lens is not in place but is erected when control valve 30 is opened. The elements of this system are to be supported by structure of a space station so that the elements are mounted in a relatively fixed position relative to each other. It is also pointed out that the gas optical lens of this invention can be used with the known laser outputs of various wavelengths.

We claim:

1. An erectable optics for outer space applications comprising a housing having a resonator cavity therein with reflective mirror means at opposite ends of the resonator cavity for reflecting light out of the resonator cavity, a beam reflector and a beam expander mounted on said housing for receiving said reflected out light and for expanding said light, a gas dynamic lens mounted relative to said housing, and said gas dynamic lens being constructed so as to focus and direct the expanding light coming from said beam expander toward a target.

2. An erectable optics for outer space applications as set forth in claim 1, wherein said minor means includes convex mirror means mounted at one end of said resonator cavity and concave mirror reflecting means at an opposite end of said resonator cavity, and said convex mirror means and said beam reflector being fabricated on a common member.

3. An erectable optics for outer space applications as set forth in claim 2, wherein said gas dynamic lens includes a source for providing pressurized gas, a pop action control valve for controlling flow of said gas to a plenum chamber, said plenum chamber having a multiplicity of outlet nozzles radially therefrom for passing gas therethrough, means mounted in the plenum chamber for decreasing the cross-sectional area of the plenum chamber from a front portion of the chamber to a back portion to cause the gas pressure to be substantially constant along a length of the plenum chamber, an outer structure secured to said plenum chamber and the space between said plenum chamber outlet nozzles and said outer structure defining the gas lens that is provided gas from said source.

4. An erectable optics for outer space applications as set forth in claim 3, wherein said outer structure includes end members with thin flat members arranged radially about a periphery to direct gas away from the structure in such a way that torque is not produced to tend to cause rotation of the lens structure.

5. An erectable optics for outer space applications as set forth in claim 4, wherein said outlet nozzles are defined by spaced rod members about the plenum chamber.

* * * * *